United States Patent
Yasumatsuya (10) Patent No.: US 6,918,719 B2
(45) Date of Patent: Jul. 19, 2005

(54) MACHINE TOOL (75) Inventor: Kaoru Yasumatsuya, Yamatokoriyama (JP)

(73) Assignee: Mori Seiki Co. Ltd., Yamatokoriyama (JP)

( * ) Notice: Subject to any disclaimer, the term of this patent is extended or adjusted under 35 U.S.C. 154(b) by 426 days.

(21) Appl. No.: 10/310,066

(22) Filed: Dec. 5, 2002

(65) Prior Publication Data
US 2003/0113179 A1 Jun. 19, 2003

(30) Foreign Application Priority Data
Dec. 7, 2001 (JP) ........................................ 2001-373880

(51) Int. Cl.$^7$ .............................................. B23Q 11/00
(52) U.S. Cl. ...................... 409/137; 409/134; 409/136; 483/114
(58) Field of Search .......................... 408/56, 61, 234, 408/235, 241 G; 409/134, 135, 136, 137; 483/14; 29/DIG. 50, DIG. 61, DIG. 94, DIG. 101, DIG. 102

(56) References Cited

U.S. PATENT DOCUMENTS

| | | | | | |
|---|---|---|---|---|---|
| 5,181,898 | A | * | 1/1993 | Piotrowski ...................... | 483/3 |
| 6,082,939 | A | * | 7/2000 | Nakashima et al. .......... | 409/134 |
| 6,120,222 | A | * | 9/2000 | Hiramoto et al. ........... | 409/134 |
| 6,439,813 | B1 | * | 8/2002 | Repossini ................... | 409/235 |
| 6,530,300 | B2 | * | 3/2003 | Nakai et al. ................... | 82/117 |
| 6,682,276 | B2 | * | 1/2004 | Harami et al. .............. | 409/134 |
| 6,761,515 | B2 | * | 7/2004 | Laur et al. ................... | 409/132 |
| 2004/0047700 | A1 | * | 3/2004 | Maeda ........................ | 409/134 |

FOREIGN PATENT DOCUMENTS

JP          10-328968          12/1998

* cited by examiner

Primary Examiner—Derris H. Banks
Assistant Examiner—Ali Abdelwahed
(74) Attorney, Agent, or Firm—Westerman, Hattori, Daniels & Adrian, LLP (57) ABSTRACT

A machine tool is provided which is designed so that chips generated by the machining of a workpiece can assuredly be introduced onto a chip conveyer disposed in a trough of a bed through oil pans. The machine tool includes a column provided on one end portion of a bed (11) and movable along an X-axis on the bed (11), a spindle head (12) supported by the column and movable vertically up and down along a Y-axis, and a table (13) movable back and forth along a Z-axis with respect to the spindle head (12) on the bed (11). The bed (11) has a center trough (11a) formed in a widthwise middle portion thereof, and a pair of side troughs (11b) formed therein on widthwise opposite sides of the center trough (11a). A first chip conveyer (14) is provided in the center trough (11a), and second chip conveyers (15) are provided in the respective side troughs (11b). Oil pans (17) extend obliquely upward outwardly from the respective side troughs (11b) for introducing chips onto the second chip conveyers (15) provided in the side troughs (11b).

11 Claims, 7 Drawing Sheets

MACHINE TOOL

BACKGROUND OF THE INVENTION

1. Field of the Invention

The present invention relates to a machine tool having oil pans for introducing chips generated by the machining of a workpiece onto a chip conveyer disposed within a trough formed in a bed. Particularly, the invention relates to a machine tool which is designed so that chips generated by the machining of a workpiece can assuredly be introduced onto a chip conveyer through oil pans.

2. Description of Related Art

Figure 7:
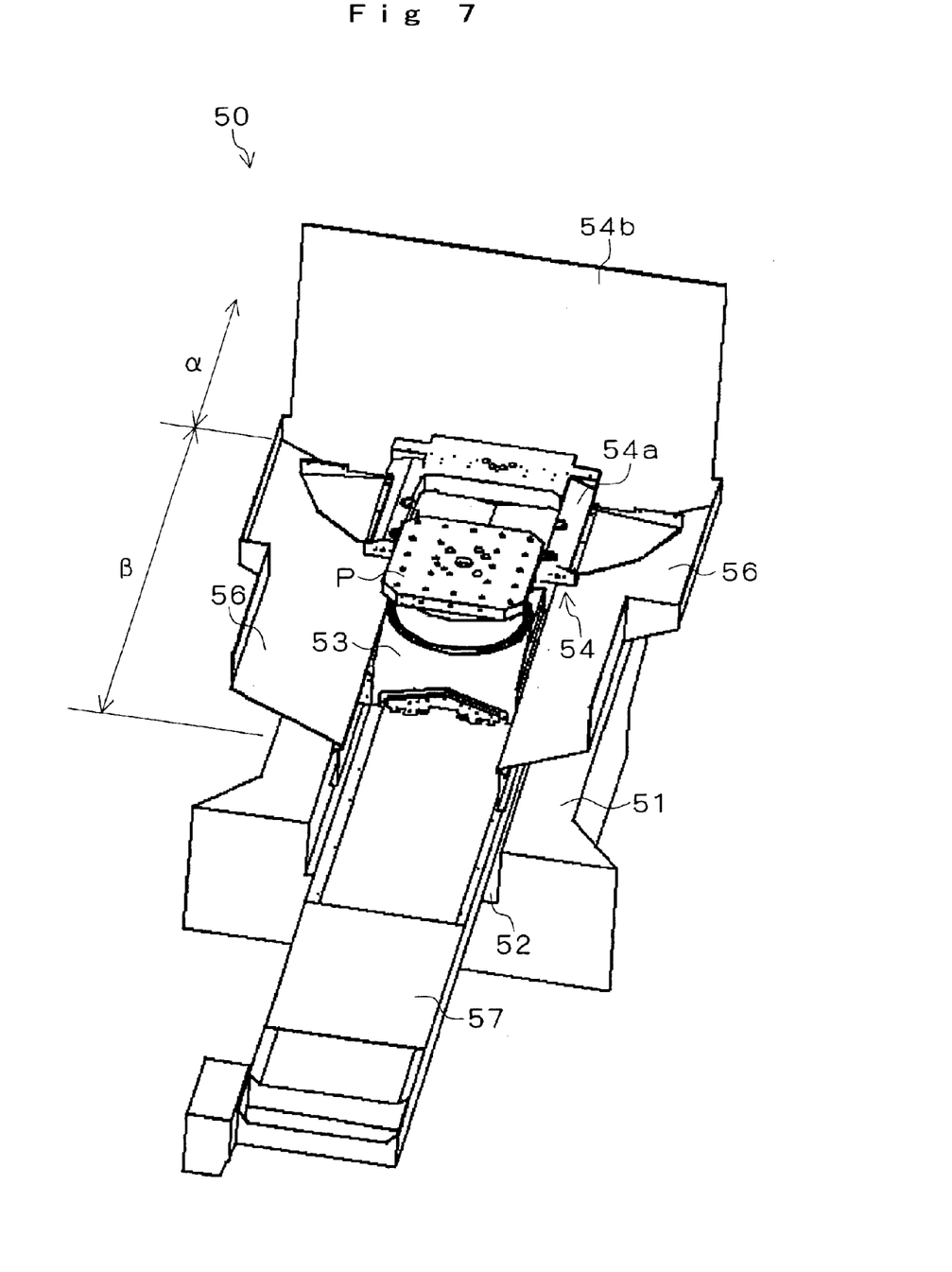
FIG. 7 is a perspective view of a conventional horizontal machining center as seen from the side of a spindle head.
Figure 8:
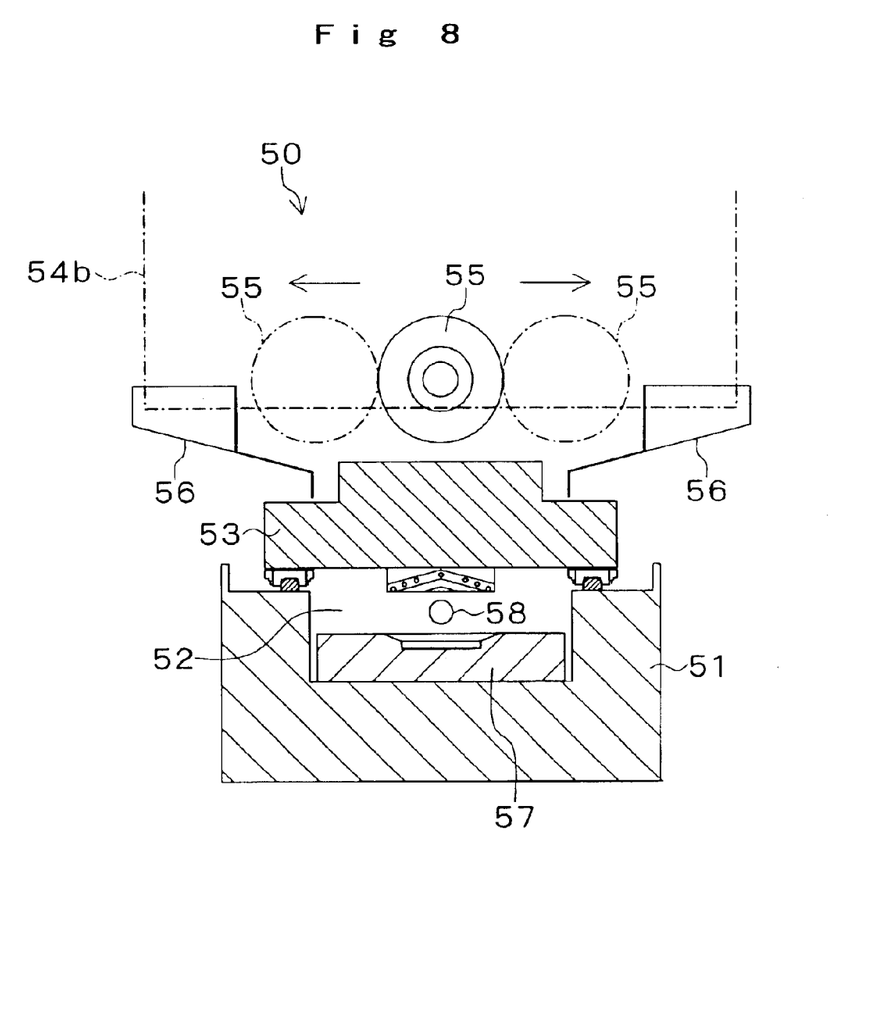
FIG. 8 is a sectional view illustrating the conventional horizontal machining center.

An exemplary machine tool of the aforesaid type is a horizontal machining center 50 as shown in FIGS. 7 and 8. As shown, the horizontal machining center 50 includes a bed 51 having a center trough 52 formed in a widthwise middle portion thereof, a table 53 movable longitudinally of the bed 51 on the bed 51 and pivotally supporting a pallet P carrying a workpiece, an automatic pallet changer 54 for automatically exchanging a workpiece-carrying pallet P located in a preparation region α adjacent to one longitudinal end of the bed 51 and the workpiece-carrying pallet P mounted on the table 53 in a machining region β, and a spindle head 55 disposed at the other longitudinal end of the bed 51 and movable transversely and vertically of the bed 51. In FIG. 7, the horizontal machining center 50 is illustrated with the spindle head 55 removed.

The automatic pallet changer 54 includes a pair of pallet exchange arms 54a pivotal about a pivot point located on a boundary between the preparation region α and the machining region β, and a separation plate 54b separating the preparation region α and the machining region β. When the pallet P mounted on the table 53 is changed, the pallet exchange arms 54a are pivoted together with the separation plate 54b.

Oil pans 56 for introducing chips generated by the machining of the workpiece into the center trough 52 are provided on widthwise opposite portions of the bed 51 in the machining region β as extending obliquely upward outwardly from widthwise opposite sides of the center trough 52. A chip conveyer 57 is provided in the center trough 52 as extending from the preparation region α toward the spindle head 55 through the machining region β for conveying chips removed from the workpiece and the pallet into the center trough 52 by an operator in the preparation region α and chips introduced into the center trough 52 through the oil pans 56 away from the preparation region α and the machining region β.

A ball screw 58 of a reciprocal drive mechanism for the table 53 is supported rotatably at a fixed position above the chip conveyer 57 in the center trough 52. A chevron-shaped extendible cover (not shown) is attached to the table 53 as covering the ball screw 58.

In the aforesaid horizontal machining center 50, the oil pans 56 each have a reduced inclination angle as shown in FIG. 8 for prevention of interference with the spindle head 55 to be moved transversely of the bed 51 during the machining of the workpiece and interference with the separation plate 54b to be pivoted for the exchange of the workpiece-carrying pallets P. With the reduced inclination angle of the oil pans 56, however, the chips generated by the machining of the workpiece are liable to remain on slant surfaces of the oil pans 56, making it difficult to assuredly introduce the chips onto the chip conveyer 57 in the center trough 52.

Since the chip conveyer 57 extends to the preparation region α for transporting the chips away from the preparation region α in the horizontal machining center 50, the ball screw 58 of the reciprocal drive mechanism for the table 53 is located above the chip conveyer 57 within the center trough 52. Therefore, the center trough 52 should have a greater depth, so that the rigidity of the bed 51 is reduced.

It is therefore an object of the present invention to provide a machine tool which is designed so that chips generated by the machining of a workpiece can assuredly be introduced onto a chip conveyer disposed in a trough of a bed through oil pans. It is another object of the present invention to provide a machine tool which is designed so that a center trough has a minimum depth even if a ball screw is provided in the center trough.

SUMMARY OF THE INVENTION

In accordance with the present invention to overcome the aforesaid drawbacks, there is provided a machine tool, which comprises: a bed having a center trough formed in a widthwise middle portion thereof and a pair of side troughs formed therein on widthwise opposite sides of the center trough; a first chip conveyer provided in the center trough; second chip conveyers provided in the respective side troughs; a table provided across the center trough and movable back and forth longitudinally of the bed on the bed; and a pair of oil pans extending obliquely upward outwardly from the respective side troughs for introducing chips onto the second chip conveyers.

As described above, the side troughs are provided on the opposite sides of the center trough formed in the widthwise middle portion of the bed in the machine tool. The first chip conveyer is disposed in the center trough, and the second chip conveyers are disposed in the respective side troughs. The chips are introduced into the side troughs through the oil pans provided on the widthwise opposite sides of the bed. Therefore, the oil pans can be located with lower edges thereof spaced a greater distance and, hence, a horizontal distance between the lower and upper edges of each of the oil pans as viewed in plan can be reduced, as compared with the conventional machine tool in which the single center trough is provided in the widthwise middle portion of the bed and the chips are introduced into the center trough through the oil pans provided on the widthwise opposite portions of the bed. Therefore, the oil pans are inclined at a greater inclination angle than the oil pans provided in the conventional machine tool, so that the chips are less liable to remain on the slant surfaces of the oil pans. Thus, chips impinging on the oil pans can assuredly be introduced onto the second chip conveyers in the side troughs during the machining of a workpiece.

The machine tool further comprises a reciprocal drive mechanism for moving the table back and forth on the bed. The reciprocal drive mechanism includes a ball screw supported by one of the bed and the table, a ball nut supported by the other of the bed and the table in threading engagement with the ball screw, and rotative drive means for rotating one of the ball screw and the ball nut. The ball screw is disposed in the center trough in non-overlapping relation with respect to the first chip conveyer as seen in plan. In this case, the first chip conveyer and the ball screw can be located at the same level. Therefore, where the ball screw is disposed in the center trough, the center trough may have a reduced depth as compared with the conventional machine tool in which the ball screw is located above the chip conveyer provided in the center trough. Thus, the rigidity of the bed can be increased.

For the provision of the ball screw in non-overlapping relation with respect to the first chip conveyer in the center trough as seen in plan, the first chip conveyer is disposed in a part of the center trough which is exposed when the table is moved to the vicinity of a preparation region in a machining region. The ball screw is supported rotatably at a fixed position by the bed, and the ball nut is supported by the table via a support member projecting toward the preparation region so as not to allow the ball screw to project over the first chip conveyer. In this case, the rotative drive means rotates the ball screw. Alternatively, the ball screw is fixed to the table so as not to project over the first chip conveyer, and the ball nut is supported rotatably at a fixed position by the bed. In this case, the rotative drive means rotates the ball nut.

In the machine tool, the second chip conveyers extend from the machining region to the preparation region. In this case, the chips can be transported away from the preparation region by the second chip conveyers provided in the side troughs without the need for extending the chip conveyer provided in the center trough into the preparation region.

The machine tool may further comprise a slideway cover attached to the table for covering a slideway of the bed for guiding the table. The slideway cover extends toward a spindle head provided at an end portion of the bed opposite from the preparation region across the machining region. The slideway cover has an inside portion divided into upper and lower portions to provide a channel above the slideway for accommodating cables which are led out of the machining region. Even where a coolant is sprayed over the table and peripheral portions of the center trough and the side troughs for assuredly introducing the chips generated during the machining of the workpiece onto the chip conveyers, the cables led out of the machining region can be protected from the coolant by the slideway cover. Therefore, a need for separately providing a cable cover is obviated.

The foregoing and other objects, features and effects of the present invention will become more apparent from the following description of the preferred embodiments with reference to the attached drawings.

DESCRIPTION OF THE PREFERRED EMBODIMENTS

With reference to the drawings, the present invention will hereinafter be described by way of embodiments thereof. As shown in FIGS. 1 to 4, a horizontal machining center 1 according to one embodiment of the present invention includes a column (not shown) provided on one end portion of a bed 11 and movable along an X-axis on the bed 11, a spindle head 12 supported by the column and movable vertically up and down along a Y-axis, and a table 13 movable back and forth along a Z-axis with respect to the spindle head 12 on the bed 11. The table 13 is capable of pivotally holding a pallet P on which a workpiece is fixed.

The bed 11 has a center trough 11a formed in a widthwise middle portion of a top face thereof as extending along the Z-axis, and a pair of side troughs 11b formed in the top face thereof on widthwise opposite sides of the center trough 11a as extending along the Z-axis. A first chip conveyer 14 is provided in the center trough 11a, and second chip conveyers 15 are provided in the respective side troughs 11b for conveying chips generated by the machining of the workpiece away from the horizontal machining center (toward one end of the bed 11).

Figure 4:
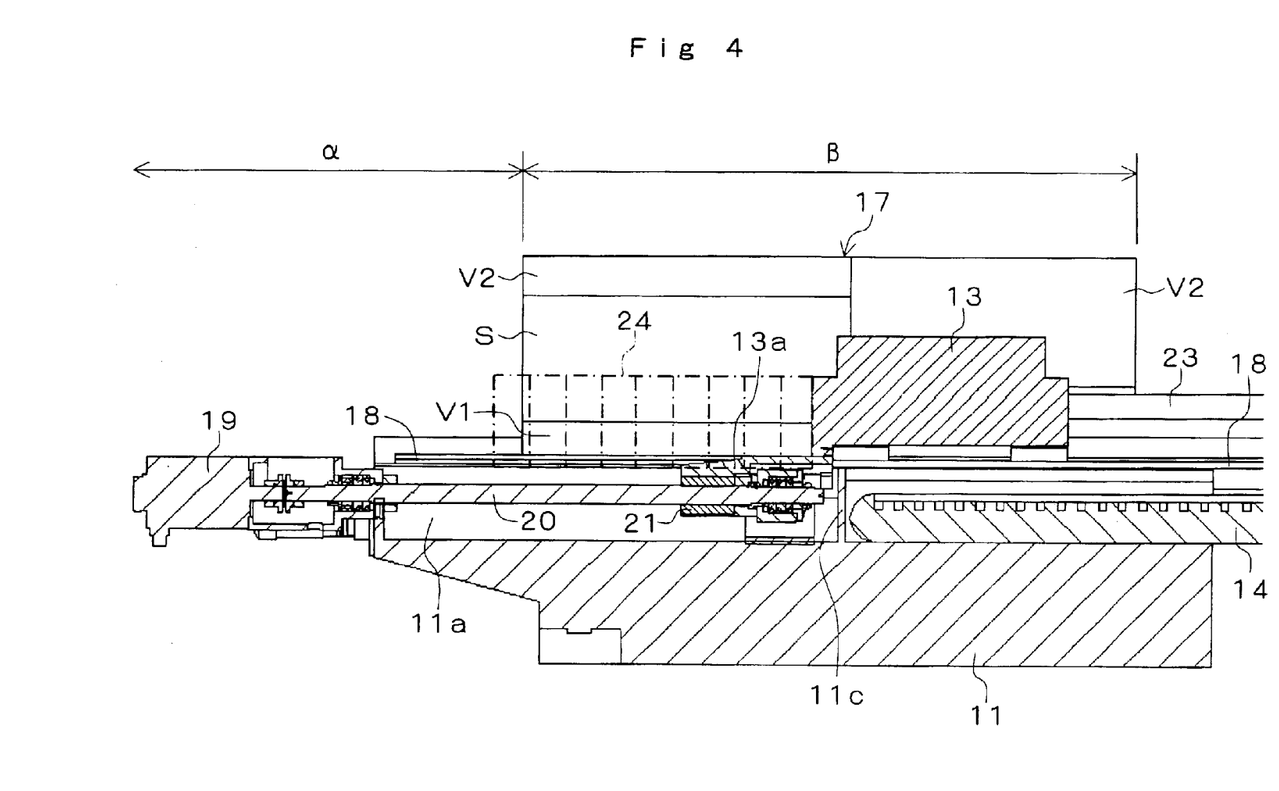
FIG. 4 is a sectional view of the horizontal machining center taken along a Z-axis.

As shown in FIG. 4, the center trough 11a is partitioned by a partition wall 11c provided in a longitudinally middle portion of a machining region β. A part of the center trough 11a located on a side of the partition wall 11c closer to the spindle head 12 is exposed when the table 13 is moved closest to a preparation region α in the machining region β, and the first chip conveyer 14 is disposed in the to-be-exposed part of the center trough 11a. On the other hand, the second chip conveyers 15 disposed in the respective side troughs 11b extend from one longitudinal end of the bed 11 to the preparation region a at the other longitudinal end of the bed 11 through the machining region β as shown in FIG. 1.

Figure 1:
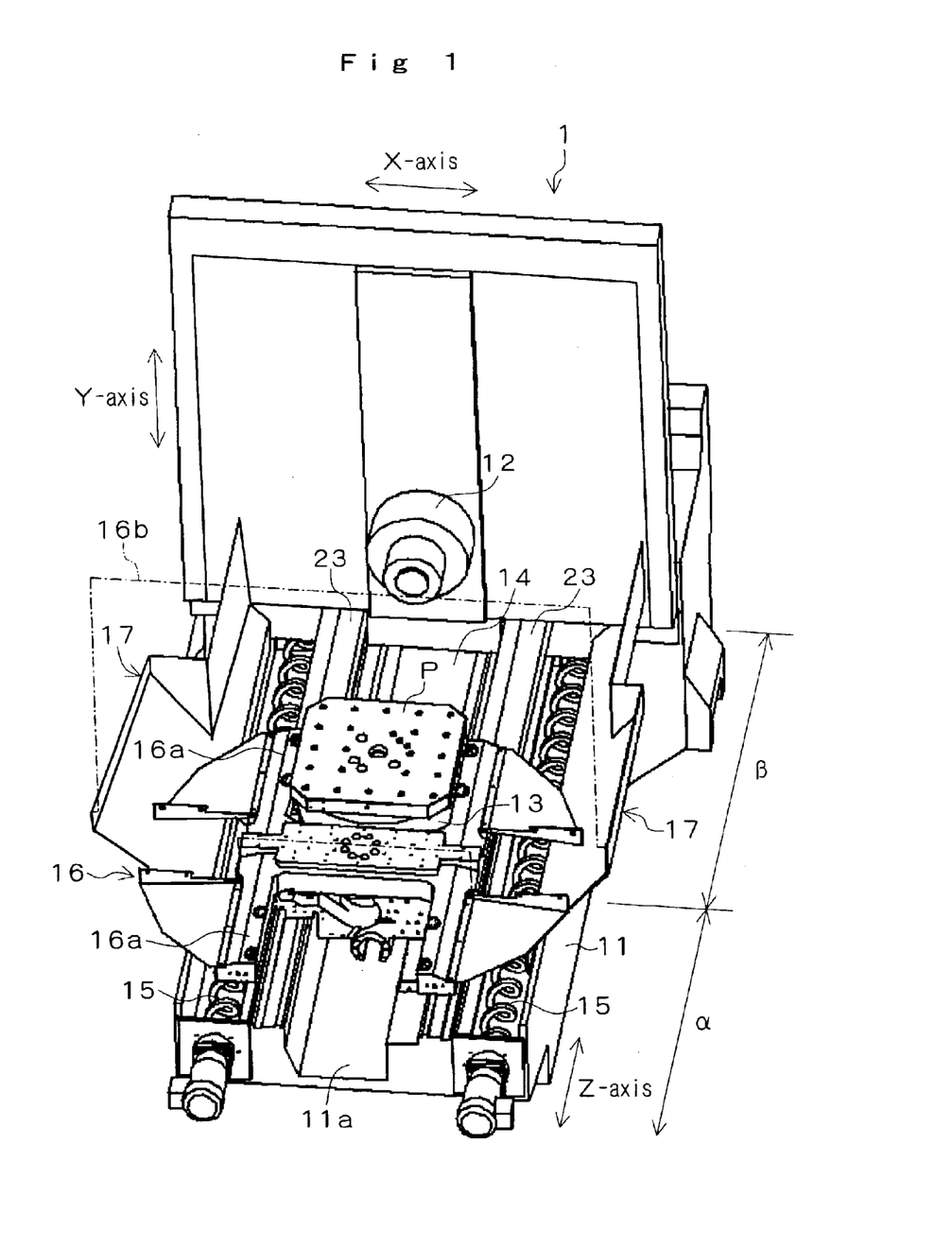
FIG. 1 is a perspective view illustrating a horizontal machining center as a machine tool according to one embodiment of the present invention.
Figure 2:
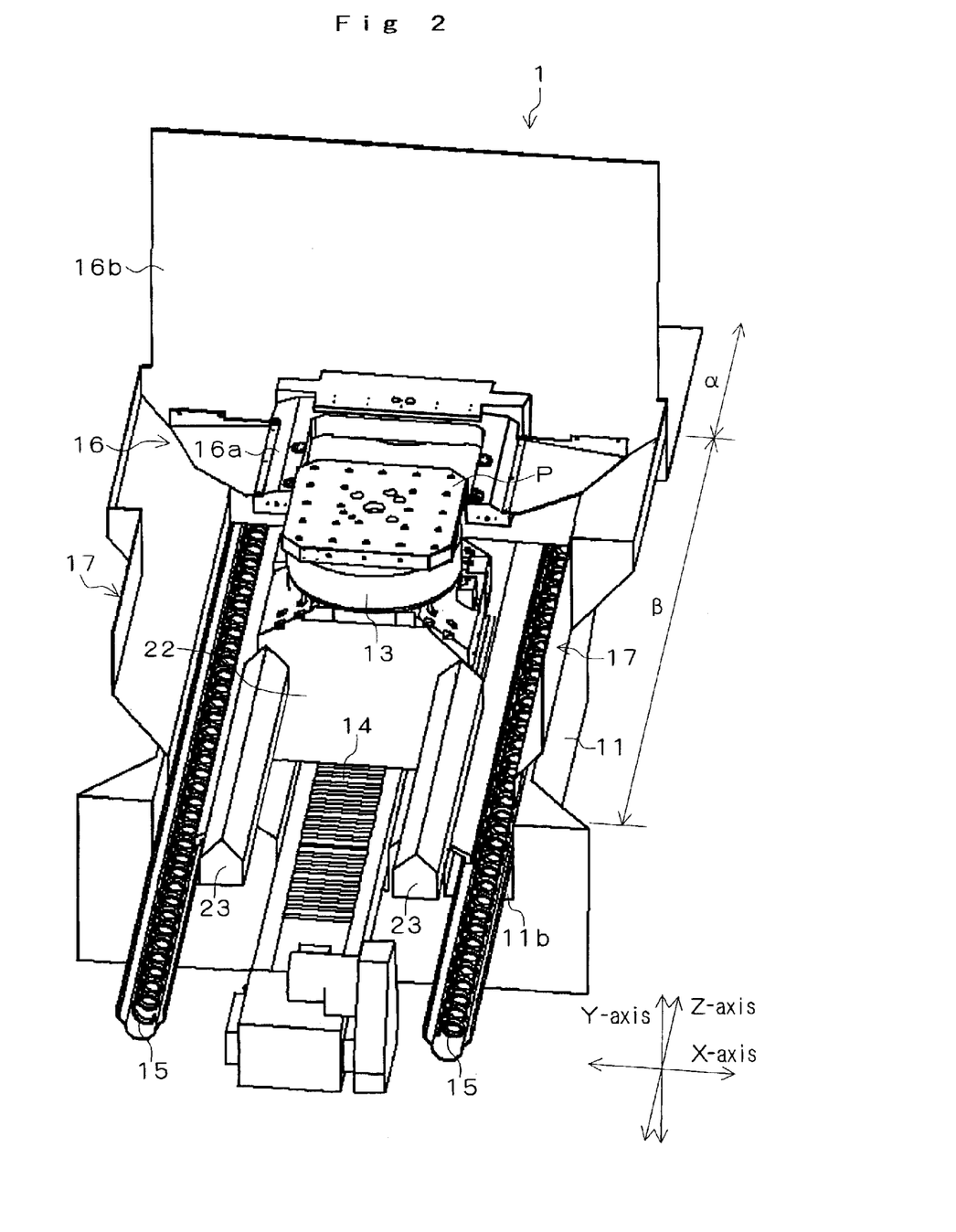
FIG. 2 is a perspective view of the horizontal machining center as seen from the side of a spindle head.

As shown in FIGS. 1 and 2, the horizontal machining center 1 further includes an automatic pallet changer 16 for automatically exchanging a workpiece-carrying pallet P mounted on the table 13 movable in the machining region β and a workpiece-carrying pallet P located in the preparation region α. The automatic pallet changer 16 includes a pair of pallet exchange arms 16a pivotal about a pivot point located on a boundary between the preparation region α and the machining region β, and a separation plate 16b separating the preparation region α and the machining region β. When the pallet P mounted on the table 13 is changed, the pallet exchange arms 16a are pivoted together with the separation plate 16b.

As shown in FIGS. 1 to 4, a pair of oil pans 17 for introducing the chips generated by the machining of the workpiece into the second chip conveyers 15 disposed in the respective side troughs 11b are provided on widthwise opposite sides of the bed 11 in the machining region β. The oil pans 17 each includes a lower vertical portion V1 extending upright along an outer side wall of the side trough 11b, a slant portion S extending obliquely upward outwardly from an upper edge of the lower vertical portion V1, and an upper vertical portion V2 vertically extending upright from an upper edge of the slant portion S.

The upper vertical portions V2 of the respective oil pans 17 are spaced by different distances on the side of the spindle head 12 in the machining region β and on the side of the preparation region α in the machining region β. The distance between the upper vertical portions V2 of the respective oil pans 17 on the side of the spindle head 12 is determined so as to prevent interference between the upper vertical portions V2 and the spindle head 12 to be moved along the X-axis as shown in FIG. 3A, and the distance between the upper vertical portions V2 of the respective oil pans 17 on the side of the preparation region α is determined so as to prevent interference between the upper vertical portions V2 and the separation plate 16b of the automatic pallet changer 16 to be pivoted for changing the pallet P as shown in FIG. 3B.

Figure 3A:
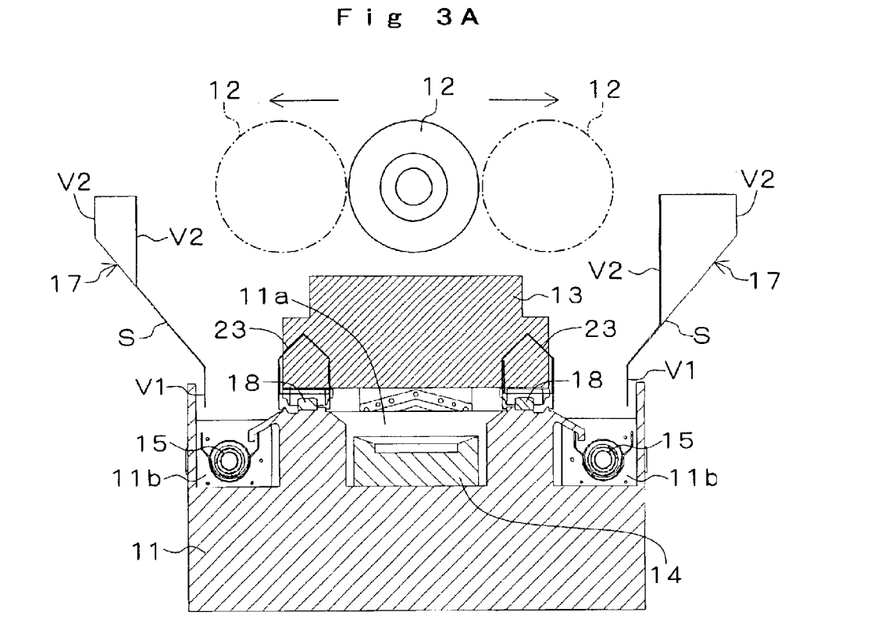
FIGS. 3A and 3B are sectional views of the horizontal machining center taken along an X-axis.
Figure 3B:
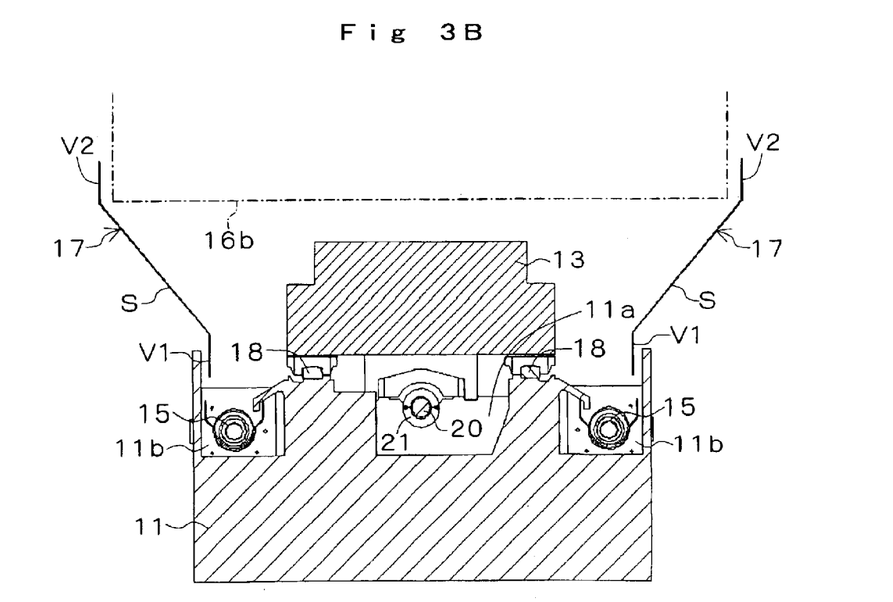

As shown in FIGS. 3A, 3B and 4, the table 13 is provided across the center trough 11a, and is movable back and forth along the Z-axis on a pair of slideways 18 of the bed 11 provided between the center trough 11a and the respective side troughs 11b. A ball screw 20 of a reciprocal drive mechanism for the table 13 is supported rotatably at a fixed position on the side of the preparation region α in the center trough 11a partitioned by the partition wall 11c.

As shown in FIG. 4, a ball nut 21 in threading engagement with the ball screw 20 is attached to the table 13 via a bracket 13a projecting toward the preparation region α. The ball screw 20 is rotated by a servo motor 19 provided in the preparation region α, whereby the table 13 is moved along the Z-axis in the machining region β.

As shown in FIGS. 1 to 4, a slant cover 22 (see FIG. 2) inclined downward toward the spindle head 12 and a pair of chevron-shaped slideway covers 23 extending toward the spindle head 12 for covering the respective slideways 18 are fixed to an end face of the table 13 facing toward the spindle head 12. Further, a chevron-shaped extensively movable cover 24 for covering the ball screw 20 and the pair of slideways 18 is attached to an end face of the table 13 facing toward the preparation region α.

Figure 5A:
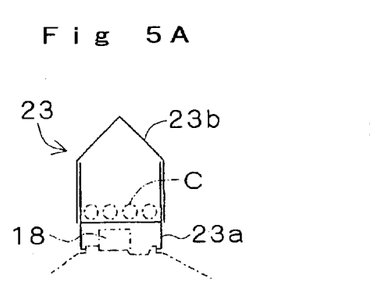
FIG. 5A is a sectional view illustrating a slideway cover employed in the horizontal machining center.
Figure 5B:
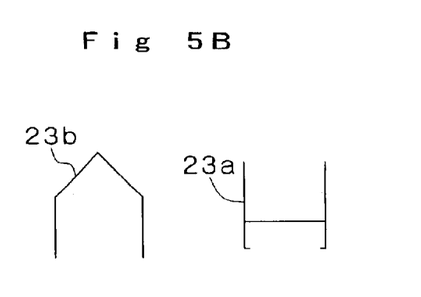
FIG. 5B is an exploded sectional view illustrating the slideway cover.

As shown in FIGS. 5A and 5B, the slideway covers 23 each include a lower cover 23a having an H-shaped cross section for covering the slideway 18, and an upper cover 23b having a chevron-shaped cross section and engaged with an upper portion of the lower cover 23a. The lower cover 23a and the upper cover 23b are combined into the slideway cover 23, whereby the inside portion of the slideway cover 23 is divided into an upper and lower portions to provide a channel above the slideway 18 for accommodating cables, an oil supply tube C and the like which are led out of the machining region β.

In the horizontal machining center 1, as described above, the pair of side troughs 11b are provided on the widthwise opposite sides of the center trough 11a formed in the widthwise middle portion of the bed 11. The first chip conveyer 14 is provided in the center trough 11a, and the second chip conveyers 15 are provided in the respective side troughs 11b. The oil pans 17 are provided on the widthwise opposite sides of the bed 11 for introducing the chips into the second chip conveyers 15 in the respective side troughs 11b. Therefore, the oil pans 17 can be located with the lower vertical portions V1 thereof spaced a greater distance from each other and, hence, a horizontal distance between the lower vertical portion V1 and the upper vertical portion V2 of each of the oil pans 17 as viewed in plan is reduced as compared with the conventional machine tool in which only the center trough is provided in the widthwise middle portion of the bed and the oil pans are provided on the widthwise opposite portions of the bed for introducing the chips into the center trough. Accordingly, the slant portions S of the oil pans 17 are inclined at a greater inclination angle as compared with the oil pans provided in the conventional machine tool. As a result, chips impinging on the oil pans 17 during the machining of the workpiece are less liable to remain on the slant portions S of the oil pans 17, so that the chips generated during the machining of the workpiece can assuredly be introduced onto the second chip conveyers 15 in the side troughs 11b.

In the horizontal machining center 1, the first chip conveyer 14 is disposed on the side of the spindle head 12 in the center trough 11a partitioned by the partition wall 11c. Further, the ball nut 21 is supported by the table 13 via the bracket 13a projecting toward the preparation region α, and the ball screw 20 is provided on the side of the preparation region α in the center trough 11a partitioned by the partition wall 11c. Therefore, the first chip conveyer 14 and the ball screw 20 can be located at the same level. Where the ball screw is provided in the center trough, the depth of the center trough 11a can be reduced as compared with the conventional machine tool in which the ball screw is supported above the chip conveyer via the support member transversely straddling the center trough. Therefore, the rigidity of the bed 11 can be increased. Further, the ball screw 20 can be supported by a support member disposed on the bottom of the center trough 11a, so that the rigidity of the support member for the ball screw 20 can be increased.

In the horizontal machining center 1, the second chip conveyers 15 provided in the respective side troughs 11b extend into the preparation region α. Therefore, the chips in the preparation region α can be transported out of the horizontal machining center by the second chip conveyers 15 in the side troughs 11b without the need for extending the first conveyer 14 provided in the center trough 11a into the preparation region α.

In the horizontal machining center 1, as described above, the inside portions of the slideway covers 23 attached to the table 13 are each divided into the upper and lower portions to provide the channels above the slideways 18 for accommodating the cables, the oil supply tubes and the like which are led out of the machining region β. Even where a coolant is sprayed over the table 13 and peripheral portions of the center trough 11a and the side troughs 11b for assuredly introducing the chips generated during the machining of the workpiece onto the chip conveyers, the cables and the like led out of the machining region β is protected from the coolant by the slideway covers 23. Therefore, the need for separately providing a cable cover is obviated.

The aforesaid embodiment is directed to a case where the upper vertical portions V2 of the respective oil pans 17 are spaced a greater distance from each other for prevention of the interference with the separation plate 16b of the automatic pallet changer 16. Even in the case of a horizontal machining center not provided with the automatic pallet changer 16, the machining region β should have a sufficient width along the X-axis, and the distance between the upper vertical portions V2 of the oil pans 17 should be determined so as to prevent the interference between the upper vertical portions V2 and the spindle head 12 movable along the X-axis. Therefore, the present invention is applicable to such a horizontal machining center to provide the same effect.

Figure 6:
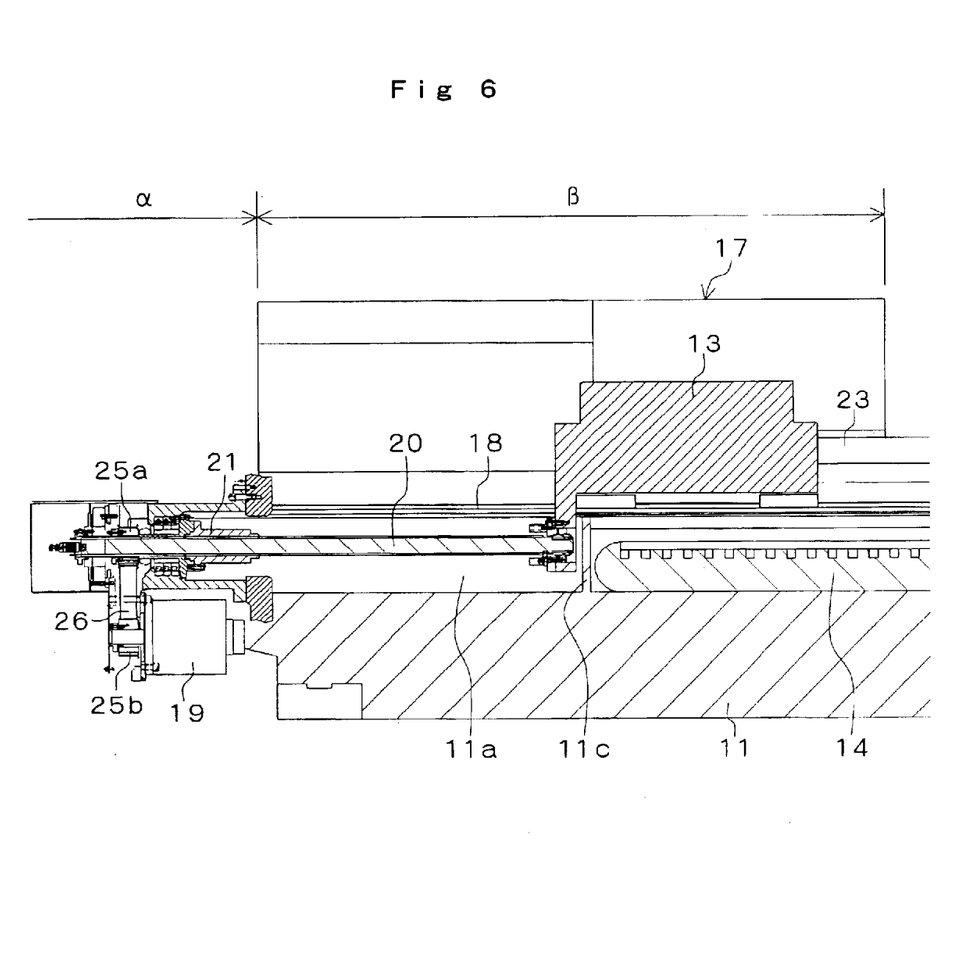
FIG. 6 is a sectional view illustrating a horizontal machining center according to another embodiment of the present invention taken along a Z-axis.

In the aforesaid embodiment, the ball nut 21 is supported by the table 13 via the bracket 13a projecting toward the preparation region α. This makes it possible to reduce the length of the ball screw 20, so that the first chip conveyer 14 disposed in the center trough 11a does not overlap with the ball screw 20 as viewed in plan. However, the arrangement of the ball screw 20 and the ball nut 21 is not limited to the aforesaid arrangement. For example, as shown in FIG. 6, one end of the ball screw 20 may be fixed to a portion of the table 13 closer to the preparation region α so as not to allow the ball screw 20 to project over the first chip conveyer 14 provided in the center trough 11a even when the table 13 is moved closest to the spindle head 12, and the ball nut 21 in threading engagement with the ball screw 20 may be supported rotatably at a fixed position on the side of the preparation region α in the center trough 11a partitioned by the partition wall 11c. In this case, the ball nut 21 is rotated by the servo motor 19 via timing pulleys 25a, 25b and a timing belt 26 of power transmission means to move back and forth the table 13 together with the ball screw 20 along the Z-axis. Thus, the ball screw 20 is disposed in the center trough 11a in non-overlapping relation with respect to the first chip conveyer 14 as viewed in plan.

Although the present invention is embodied as the horizontal machining center in the aforesaid embodiment, the machine tool according to the present invention is not limited to the horizontal machining center. The present invention is applicable to various types of machine tools which are designed so that chips are introduced onto a chip conveyer disposed in a trough formed in a bed through an oil pan.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A machine tool comprising:
    a bed having a center trough formed in a widthwise middle portion thereof and a pair of side troughs formed therein on widthwise opposite sides of the center trough;
    a first chip conveyer provided in the center trough;
    second chip conveyers provided in the respective side troughs;
    a table provided across the center trough and movable back and forth longitudinally of the bed on the bed; and
    a pair of oil pans extending obliquely upward outwardly from the respective side troughs for introducing chips onto the second chip conveyers.

2. A machine tool as set forth in claim 1, further comprising an automatic pallet changer for automatically exchanging a workpiece-carrying pallet mounted on the table in a machining region and a workpiece-carrying pallet located in a preparation region, the automatic pallet changer comprising:
    a pair of pallet exchange arms pivotal about a pivot point located on a boundary between the preparation region and the machining region; and
    a separation plate separating the preparation region and the machining region;
    wherein the separation plate is pivoted together with the pallet exchange arms when the pallet mounted on the table is changed.

3. A machine tool as set forth in claim 2, wherein the oil pans each comprise:
    a lower vertical portion extending upright along an outer side wall of the side trough;
    a slant portion extending obliquely upward outwardly from an upper edge of the lower vertical portion; and
    an upper vertical portion vertically extending upright from an upper edge of the slant portion.

4. A machine tool as set forth in claim 3, wherein the upper vertical portions of the oil pans are spaced from each other by a first distance on the side of a spindle head in the machining region and by a second distance on the side of the preparation region in the machining region, the first distance being set to prevent interference between the upper vertical portions and the spindle head, the second distance being set to prevent interference between the upper vertical portions and the separation plate of the automatic pallet changer.

5. A machine tool as set forth in claim 1, further comprising a reciprocal drive mechanism for moving the table back and forth on the bed, the reciprocal drive mechanism comprising:
    a ball screw supported by one of the bed and the table;
    a ball nut supported by the other of the bed and the table in threading engagement with the ball screw; and
    rotative drive means for rotating one of the ball screw and the ball nut;
    the ball screw being disposed in the center trough in non-overlapping relation with respect to the first chip conveyer as seen in plan.

6. A machine tool as set forth in claim 5,
    wherein the first chip conveyer is disposed in a part of the center trough which is exposed when the table is moved to the vicinity of a preparation region in a machining region,
    wherein the ball screw is supported rotatably at a fixed position by the bed,
    wherein the ball nut is supported by the table via a support member projecting toward the preparation region so as not to allow the ball screw to project over the first chip conveyer,
    wherein the rotative drive means rotates the ball screw.

7. A machine tool as set forth in claim 5,
    wherein the first chip conveyer is disposed in a part of the center trough which is exposed when the table is moved to the vicinity of a preparation region in a machining region,
    wherein the ball screw is fixed to the table so as not to project over the first chip conveyer,
    wherein the ball nut is supported rotatably at a fixed position by the bed,
    wherein the rotative drive means rotates the ball nut.

8. A machine tool as set forth in claim 6, wherein the second chip conveyers extend from the machining region to the preparation region.

9. A machine tool as set forth in claim 7, wherein the second chip conveyers extend from the machining region to the preparation region.

10. A machine tool as set forth in claim 1, further comprising a slideway cover attached to the table for covering a slideway of the bed for guiding the table, the slideway cover extending toward a spindle head provided at an end portion of the bed opposite from a preparation region across a machining region, the slideway cover having an inside portion divided into upper and lower portions to provide a channel above the slideway for accommodating cables which are led out of the machining region.

11. A machine tool as set forth in claim 5, further comprising a slideway cover attached to the table for covering a slideway of the bed for guiding the table, the slideway cover extending toward a spindle head provided at an end portion of the bed opposite from a preparation region across a machining region, the slideway cover having an inside portion divided into upper and lower portions to provide a channel above the slideway for accommodating cables which are led out of the machining region.

* * * * *